G. S. TIFFANY.
TELAUTOGRAPHIC APPARATUS.
APPLICATION FILED SEPT. 10, 1915. RENEWED JAN. 20, 1919.
1,314,618.
Patented Sept. 2, 1919.
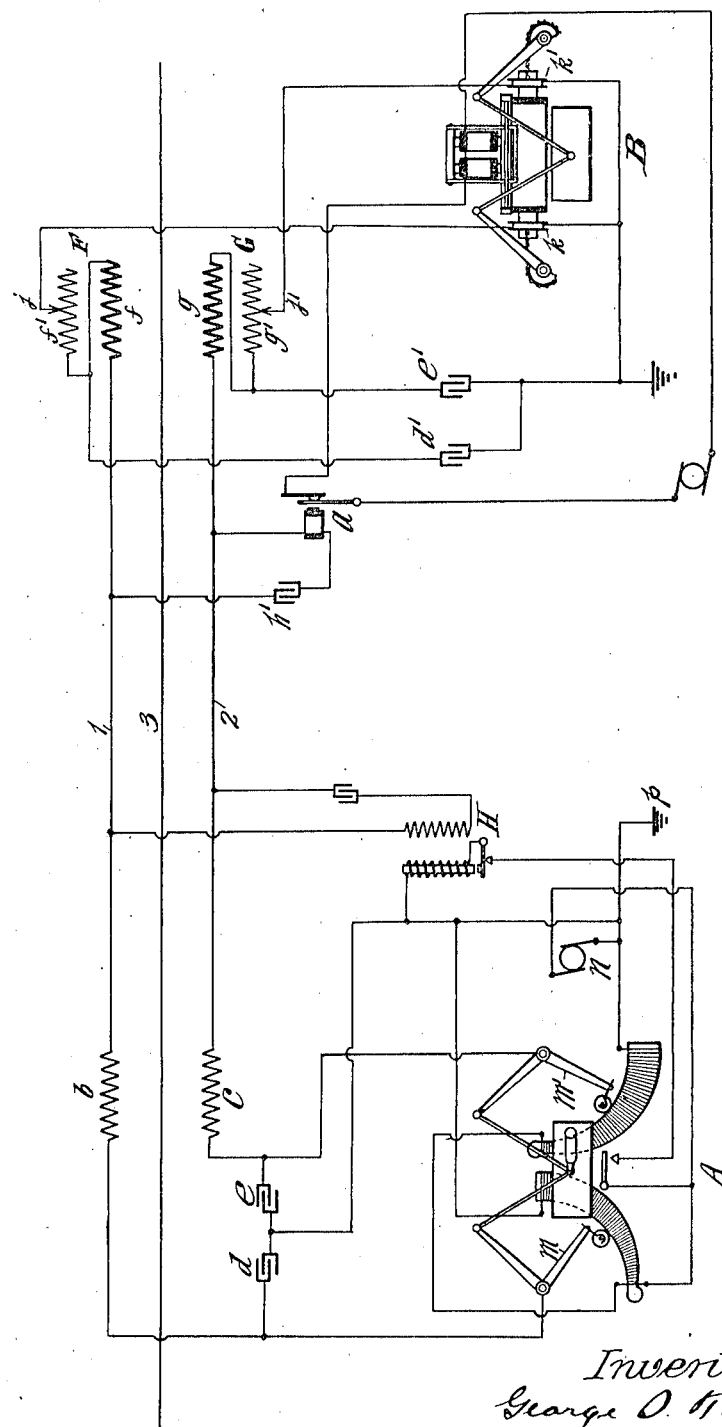
Inventor:
George O. Tiffany
by his Atty's:
Phelps Sawyer Rice Kennedy

UNITED STATES PATENT OFFICE.

GEORGE S. TIFFANY, OF SUMMIT, NEW JERSEY, ASSIGNOR TO TELAUTOGRAPH CORPORATION, OF RICHMOND, VIRGINIA, A CORPORATION OF VIRGINIA.

TELAUTOGRAPHIC APPARATUS.

1,314,618. Specification of Letters Patent. Patented Sept. 2, 1919.

Application filed September 10, 1915, Serial No. 49,883. Renewed January 20, 1919. Serial No. 272,190.

*To all whom it may concern:*

Be it known that I, GEORGE S. TIFFANY, a citizen of the United States, residing at Summit, county of Union, and State of New Jersey, have invented certain new and useful Improvements in Telautographic Apparatus, fully described and represented in the following specification and the accompanying drawings, forming a part of the same.

This invention relates to improvements in telautograph systems, and has for its object to provide such a system with means for diminishing the effect of induction, from currents in lines adjacent to the telautograph lines, upon telautograph instruments in the telautograph line circuits.

In long distance electric transmission of power, alternating currents of very high voltage are generally used and the effect of these alternating currents in inducing currents in adjacent telautograph lines is to cause violent vibrations of the receiving pen, in many instances causing such distortion of the written characters as to make them illegible.

Attempts have been made to choke down these induced currents by the introduction of inductive resistances in the telautograph line circuits, but in order that these inductive resistances be effective it is necessary to make the inductance very high and this has an injurious effect upon the operation of the telautograph by retarding the writing currents, thus causing the receiving pen to respond sluggishly.

The invention will first be described in connection with the accompanying drawings and then more particularly pointed out.

In the drawing is illustrated diagrammatically an arrangement of circuits whereby the injurious effect of the induced currents is largely neutralized.

Referring to the drawings, a telautograph transmitter is shown at A and a receiver at B. Line wires 1 and 2 connect these instruments. At 3 is indicated a line assumed to be carrying high voltage alternating currents which cause induced currents to traverse lines 1 and 2.

At $b$ and $c$ are indicated inductance coils which are in circuit with the lines 1, 2, respectively.

At $d$, $e$, are indicated condensers bridged across the lines at the transmitter terminals. One side of each condenser is connected to ground, as for example, by the common ground connection $p$.

F and G indicate transformers, the primary windings $f$ and $g$ of which are connected in circuit with lines 1 and 2 respectively, and are also connected with the secondary windings $f'$ and $g'$.

One side of condensers $d'$, $e'$, have a common connection to ground, the other terminal of condenser $e'$ being connected to transformer G at the junction of the primary and secondary windings and the corresponding terminal of $d'$ being connected with transformer F at the junction of its primary and secondary windings.

The movable coils $k$, $k'$ of the receiver are connected to the respective secondary windings of transformers through adjustable contacts $j$, $j'$ respectively. Also these coils $k$, $k'$ are each connected to ground.

At the transmitter the contact arms $m$, $m'$ are connected to the line wires 1 and 2, respectively through the inductive resistances $b$ and $c$. A generator $n$, having one terminal connected to ground and to the transmitter rheostats and its other terminal connected with the other terminals of the rheostats, serves to supply the writing currents.

The operation of the above system is as follows:

Assuming that an alternating current is traversing line 3, this alternating current will induce corresponding currents in lines 1, 2 and these induced currents will flow to ground at the receiving and transmitting stations.

At the transmitter, the condensers $d$, $e$, offer the equivalent of a low resistance path to ground for alternating currents and at the receivers the condensers $d'$ and $e'$ afford a similar path. A portion of the induced currents will attempt to find a path to ground through the coils $k$, $k'$ and if permitted to do so would injuriously affect the operation of these coils. In order to retard the flow of the induced currents through these coils, the secondary windings of the transformer F, G, are so connected in circuit that the E. M. F's. of the currents induced in these secondary windings by the induced line currents flowing through the primary windings to ground through condensers $d'$, $e'$, will oppose the E. M. F. of the induced line currents, and by shifting the contacts $j$, $j'$, positions will be found in which the E. M. F. of the secondary currents will most effectively oppose the E. M. F. of the induced line currents.

The lines 1, 2 are assumed to be in approximately symmetrical inductive relation to line 3 so that the currents induced in lines 1, 2 are substantially alike in value and polarity, thus having little tendency to flow from one line to another.

It is obvious that in this condition the induced currents will have little effect upon a relay bridged across lines 1, 2, as is pen lifting relay $a$, through a condenser $h'$.

Although this relay $a$ will not be operated by the induction from line 3, yet it may be operated by vibrating the currents in lines 1, 2, by superimposing alternating currents from the induction coil H upon the writing current on these lines, as in this case the impulses will rise in value upon one line simultaneously as they fall in value upon the other line, thus causing these lines to act in effect as a circuit independent of the ground circuit. The primary circuit of induction coil H is arranged to be opened and close by the transmitting platen switch.

No specific description of the operation of the transmitter and receiver is given herein, as this is well known in the prior art and particularly in United States Patent No. 954,150, granted to me April 5, 1910, to which reference may be made for a full explanation of said transmitter and receiver.

What is claimed is:—

1. In a telautograph system, the combination, with a main line, a transmitting instrument having one side connected to the main line, a transformer having a terminal of one winding connected to the main line, two branches connected to the other terminal of said winding of the transformer, one branch including the other winding of the transformer and the receiving instrument, the second branch including a condenser, and means forming a return from said second branch to the other side of the transmitting instrument.

2. In a telautograph system, the combination, with a transmitter and a receiver, of a pair of main lines between said transmitter and said receiver, a condenser connected to the end of each main line at the transmitter end, a common return to which both condensers are connected, an induction coil for each line at the receiver end, the primary and secondary coils of each coil being connected in series with each other, a condenser connected to each coil intermediate the primary and secondary, said condensers being connected to the common return, and a conductor for each movable coil of the receiver, one end of each conductor being connected to the common return at the receiver end and the other end of each conductor arranged to be adjustably connected to the secondary winding of its respective induction coil.

3. In a telautograph system, the combination, with a transmitter and a receiver, of a pair of main lines between said transmitter and receiver, means for forming a common return for pulsating currents at each end of the pair of lines, a pair of conductors at the receiver each having one end connected to the common return and the other end connected to its respective main line, each conductor including the corresponding movable coil of the receiver, and means for converting a pulsating current in each line wire into a corresponding opposing pulsating current in the respective conductor connected to it whereby induction currents in the line wires are diminished in said conductors.

4. In a telautograph system, the combination, with a transmitter, a receiver, and a pair of main lines constituting parts of circuits by which movements of the receiver tracer are controlled by the transmitter tracer, of ground connections for grounding each end of each main line in shunt to the respective transmitter or receiver, a condenser in each ground connection, conductors at the receiver end, each of which is grounded at one end and connected at the other end to its respective main line, each conductor including the respective pen-moving coil of the receiver, and means for causing an alternating current in a main line to induce a corresponding opposite alternating current in the respective conductor connected to it, whereby inductive currents in each main line are neutralized in the corresponding conductors.

5. In a telautograph system, the combination, with a transmitter, a receiver and a pair of main lines connecting the receiver and transmitter by which movements of the receiver tracer are controlled by the transmitter tracer, of ground connections for grounding each end of each main line in shunt to the respective transmitter or receiver, a condenser in each ground connection, an inductive coil for each main line, each coil having its primary and secondary windings included in its respective main line and in series with each other, said windings being connected in opposition to each other, and conductors at the receiver, each of which is grounded at one end and arranged to be adjustably connected with the secondary of the respective induction coil, each conductor including the respective pen-moving coil of the receiver.

In testimony whereof, I have hereunto set my hand in the presence of the subscribing witness.

GEORGE S. TIFFANY.

Witness:
A. WHITE.